Aug. 29, 1961  G. S. DUVALL  2,997,806
BUG TRAP
Filed Feb. 16, 1960

INVENTOR
G. S. DUVALL

BY
*A. Yates Dowell*
ATTORNEY

United States Patent Office 2,997,806
Patented Aug. 29, 1961

2,997,806
BUG TRAP
George S. Duvall, 300–302 N. Main Ave.,
Denver City, Tex.
Filed Feb. 16, 1960, Ser. No. 9,042
1 Claim. (Cl. 43—121)

This invention relates to pest control including in the home and elsewhere and to apparatus employed for the trapping of roaches and other types of bugs and in a manner in which disposition can readily be made of the same.

The invention relates particularly to bug traps or the like which can be baited to attract the pests so that they will fall into an enclosure from which they cannot escape.

Many of the traps in use have caught only a small quantity of the bugs intended to be ensnared due to the nature or lack of attractiveness of the same with the result that the problem of ridding the premises of bugs has continued to exist.

It is an object of the invention to provide a simple and inexpensive bug trap which can be supplied fully assembled and ready for use on the floor or shelf of a kitchen, pantry, garage or elsewhere and in which the attractiveness of the device is enhanced to such an extent that a greater number of bugs will be caught.

Another object of the invention is to provide a bug trap constructed from a conventional container having a removable top with an opening therein through which bugs can fall and with a bait holder over such opening and an extended skirt providing a gradual incline up which the bugs can travel as well as a bug trap which can be readily emptied and cleaned.

Figure 1:
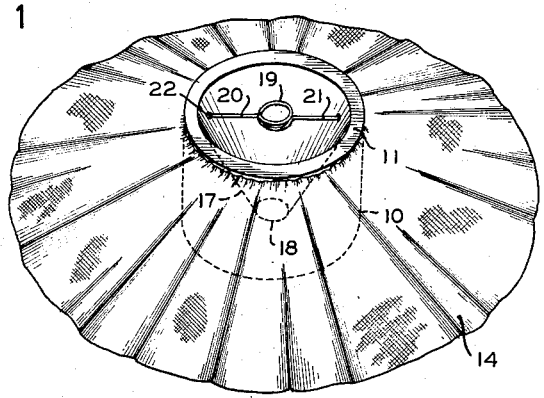
Figure 2:
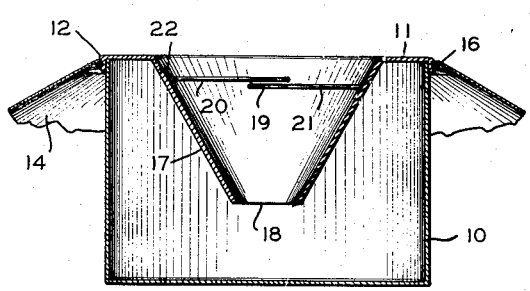
Figure 3:
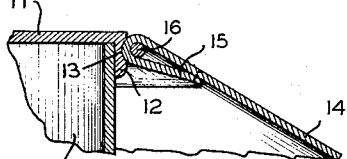
Figure 4:
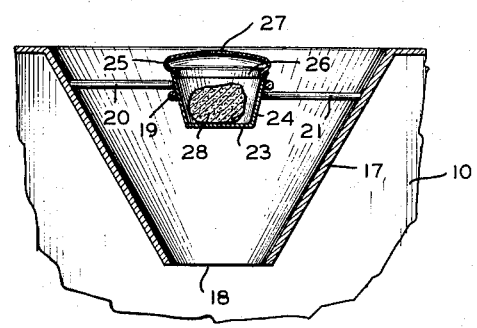
Figure 5:
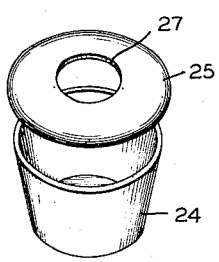

Other objects and advantages of the invention will be apparent from the following description taken in conjunction with the accompanying drawing, wherein:

FIG. 1 is a perspective illustrating one application of the invention;

FIG. 2, a vertical section;

FIG. 3, an enlarged fragmentary detail;

FIG. 4, an enlarged vertical section of the entrance and bait holder and bait container; and FIG. 5, an enlarged perspective of the bait container of FIG. 4.

Briefly stated, the present invention is a container which may be generally cylindrical or of other configuration with a central trap opening across the upper portion of which is disposed a bait holder in the form of a coil with oppositely disposed supporting arms attached to the wall of the trap opening and with a detachable skirt of relatively soft flannel or other material with an elastic cord or drawstring attached around the upper portion of the container and which skirt is adapted to be spread to its maximum diameter so that bugs may crawl up the soft material in quest of the bait and fall downward through the opening into the container.

With continued reference to the drawing, the bug trap of the present invention includes a container 10 which may be cylindrical or of other configuration and of any desired material such as relatively thin metal such as that of a generally cylindrical container used to contain coffee or the like.

The container is provided with a cover 11 having a depending flange 12 of a configuration to provide an annular recess or groove 13 for the reception of a skirt 14 of a relatively soft fabric or other material, such skirt having a portion 15 folded upon itself to provide a slot or passage for an elastic band 16 so that the skirt may be readily applied to or detached from the groove 13 at the top to facilitate ascension of the trap by bugs or the like.

The skirt 14 preferably is of soft fabric or other material to aid in the ascension of the same and to make climbing the trap much easier than climbing the vertical sides of the container. The top 11 is provided with a depending frusto-conical or funnel portion 17 defining an opening 18 through which bugs which fall into such opening can pass into the container 10.

In order to support bait a bait holder is provided in the form of a coil 19 having arms 20 and 21 secured by solder 22 or other means to diametrically opposed portions of the wall 17. Bait may be placed in the ring 19 or if preferred a small container 23 may be placed within such ring, such container having a tapered side wall 24 so that it can be pressed into tight engagement with the coil 19, such container having a cover 25 with a flange 26 adapted to fit into the upper edge of the container. The cover 25 may have a central opening 27 to allow the odor of the cheese 28 to pervade the surrounding atmosphere and attract and cause them to travel up the skirt 14 and onto the cover 11, and to slide down the inclined wall 17 and pass through the opening 18 into the container.

It will be apparent from the foregoing that the bug trap of the present invention is simple, inexpensive, of few parts, all of which can be separated for emptying and cleaning the trap. Further due to the skirt the catch or efficiency of the trap will be materially enhanced.

It will be obvious to those skilled in the art that various changes may be made in the invention without departing from the spirit and scope thereof and therefore the invention is not limited by that which is illustrated in the drawing and described in the specification, but only as indicated in the accompanying claim.

What is claimed is:

A bug trap comprising an open top container, a removable top for said container having a downwardly extending portion of a size to be frictionally telescopically engaged with said container, said top having a downwardly extending portion terminating in an opening into said container, a bait holder mounted within said downwardly extending portion and attached thereto, a bait container for removable reception within said bait holder and having a detachable cover and an opening to permit the odor of the bait to pervade the surrounding atmosphere, means providing a groove around the exterior top portion of said container, a skirt of relatively soft material in said groove about said container to facilitate ascension of bugs into the trap, and elastic means fastening said skirt in said groove, said open top container, top, skirt, and bait container being separable for the cleaning of the parts.

References Cited in the file of this patent

UNITED STATES PATENTS

| 147,226 | Defranceschini | Feb. 3, 1874 |
| 985,949 | Smith | Mar. 7, 1911 |
| 2,193,492 | Richardson | Mar. 12, 1940 |

FOREIGN PATENTS

| 37,702 | Switzerland | Aug. 29, 1906 |
| 333,097 | France | Sept. 11, 1903 |